Figure 1:
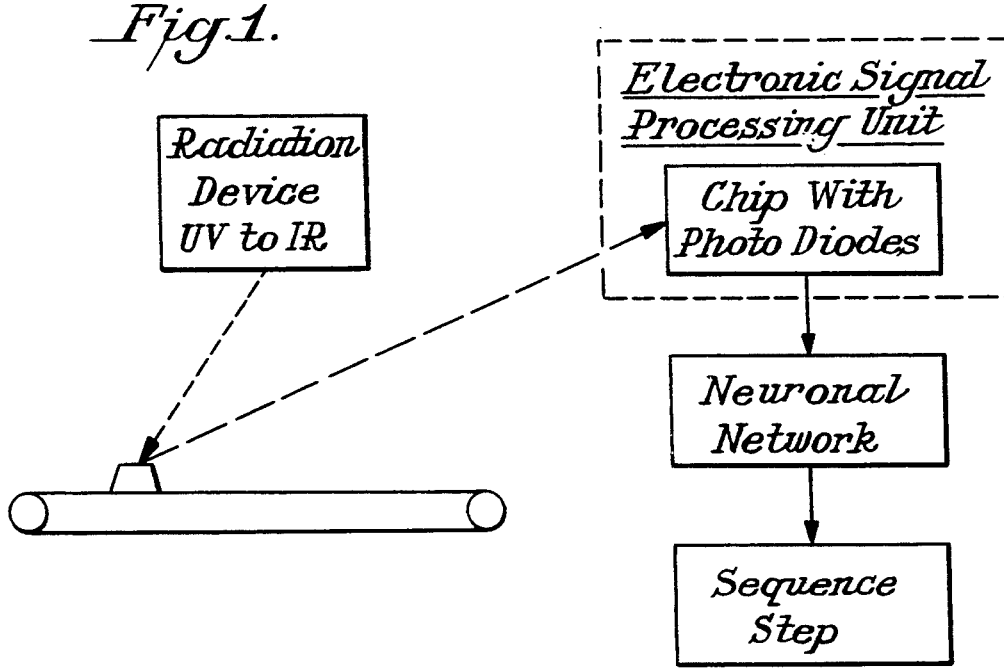
Figure 3:
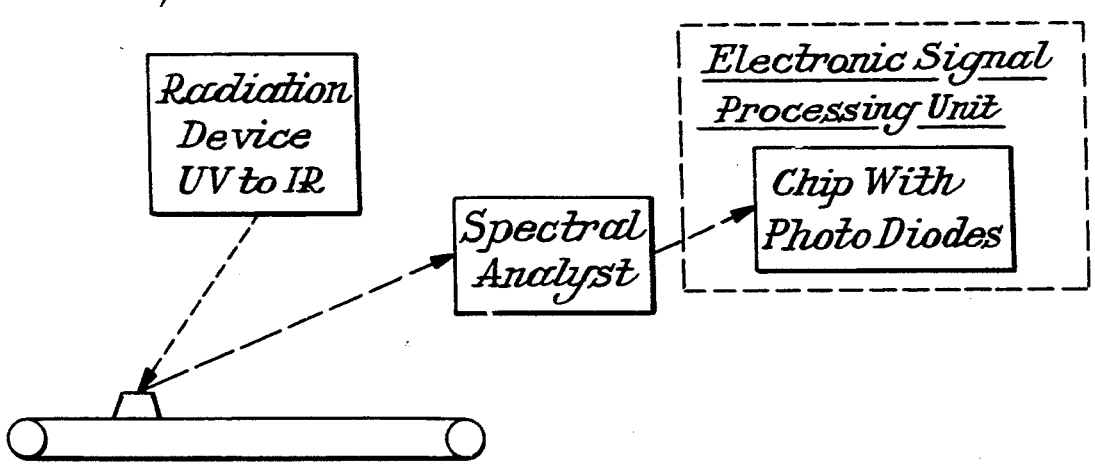

United States Patent [19]

Kaiser et al.

[11] Patent Number: 5,397,004
[45] Date of Patent: Mar. 14, 1995

[54] METHOD TO IDENTIFY OBJECTS AND A DEVICE TO IMPLEMENT SUCH A METHOD

[75] Inventors: Dieter Kaiser, Dortmund; Franz Wintrich, Essen, both of Germany

[73] Assignee: Rwe Entsorguns AG, Essen

[21] Appl. No.: 166,532

[22] Filed: Dec. 13, 1993

[30] Foreign Application Priority Data

Dec. 12, 1992 [DE] Germany .................. 42 41 990.5

[51] Int. Cl.⁶ ............................................. B07C 5/00
[52] U.S. Cl. ..................................... 209/577; 209/578
[58] Field of Search ............... 209/577, 578, 576, 585, 209/586, 587, 598, 930, 939, 940

[56] References Cited

U.S. PATENT DOCUMENTS

| | | | |
|---|---|---|---|
| 4,170,306 | 10/1979 | Marshall et al. | 209/577 X |
| 4,281,765 | 8/1981 | Brazell et al. | 209/576 |
| 4,360,539 | 11/1982 | Sachtleben et al. | 209/578 X |
| 4,576,286 | 3/1986 | Buckley et al. | 209/590 X |

FOREIGN PATENT DOCUMENTS

| | | | |
|---|---|---|---|
| 4125045 | 2/1993 | Germany | 209/578 |
| 4200971 | 7/1993 | Germany | 209/577 |

*Primary Examiner*—David H. Bollinger

[57] ABSTRACT

The present invention relates to a method to identify objects by radiating them with electromagnetic waves in UV to IR ranges and processing the waves incidenting from the object by means of an electronic signal processing unit, whereby the waves incidenting from the object strike at least one chip equipped with photo-diodes which transmits the taken photoexcitation to a neuronal network, and after alteration of defined individual or several object features such as spatial arrangement, shape and contours, or feature changes by removing parts of the object, waves incidenting from this altered object strike the chip and the transmission of the photoexcitations received by the chip to the neuronal network continues at least so long until the neuronal network transmits at least one signal specific for the object that initiates defined sequence steps. The present invention relates further to a device for implementing the method.

12 Claims, 2 Drawing Sheets

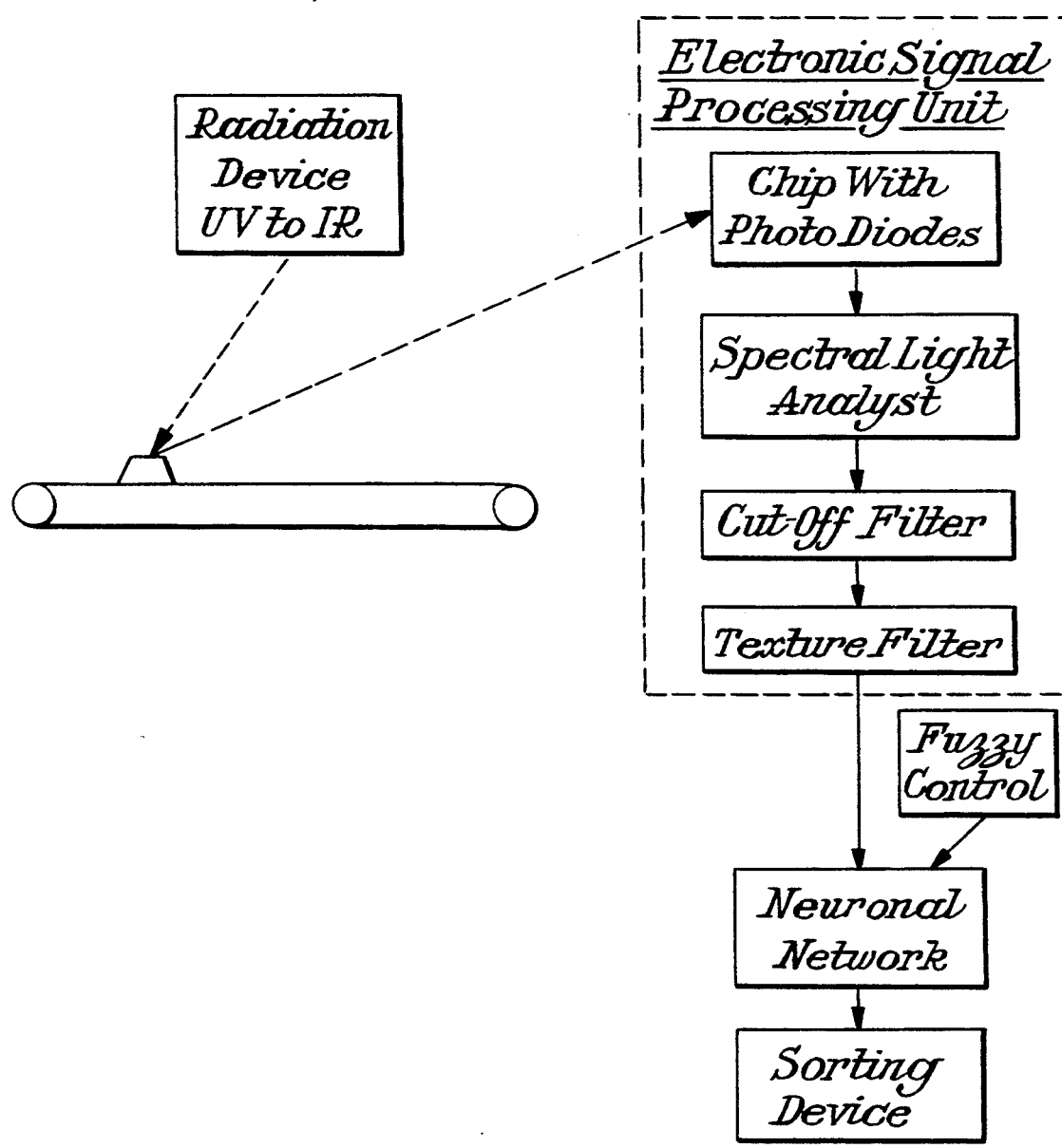

METHOD TO IDENTIFY OBJECTS AND A DEVICE TO IMPLEMENT SUCH A METHOD

DESCRIPTION OF THE INVENTION

The present invention relates to a method to identify objects by radiating them with electromagnetic waves in UV to IR ranges and processing the waves incidenting from the object by means of an electronic signal processing unit, whereby the waves incidenting from the object strike at least one chip equipped with photodiodes which transmits the taken photoexcitation to a neuronal network, and after alteration of defined individual or several object features such as spatial arrangement, shape, contours or feature changes by removing parts of the object, waves incidenting from this altered object strike the chip and the transmission of the photoexcitations received by the chip to the neuronal network continues at least so long until the neuronal network transmits at least one signal specific for the object that initiates defined sequence steps.

The identification of objects is of great importance in many fields. This applies primarily to a series of technical fields. Thus, for instance, in automatic processing of objects it may be required to identify an object at first and then transfer it to a further processing stage. The exact identification of materials in sorting processes is of particular importance. Hereby, state of the art devices are used which registrate electromagnetic waves incidenting from an object, compare them with memorized data, and subsequently transmit signals which initiate e.g. a sorting means.

In applying these known methods images of concrete objects are generated by means of electromagnetic waves incidenting from the objects and compared with memorized images. DE-OS 41 25 045 for instance discloses a method for sorting waste mixtures by radiating the waste objects with electromagnetic and/or acoustic waves, receiving the waves incidenting from the radiated waste objects in a signal processing unit for identification of the waste objects, and transmitting signals from the signal processing unit to a sorting means which sorts the identified waste object out. The signal processing unit detects features such as external object shapes, e.g. bottle, cup, collapsible tube, cubic and other shapes as well as logos, product names, corporate and manufacturer names respectively, trade marks and colours.

Correspondingly, the known methods require a data base as complete as possible for object identification and for taking certain measures, converting incidenting electromagnetic waves into defined images and comparing such images with comparison data memorized in the data base as complete as possible. After the objects have been identified, a signal is triggered which for instance puts a sorting means into operation that sorts the identified object out.

The applicant has now succeeded in developing a substantially more direct and uncomplicated method for object identification without requiring a comparison with voluminous data memories by radiating the objects with electromagnetic waves in UV to IR ranges, processing the waves incidenting from the objects by means of an electronic signal processing unit and output of signals from the electronic signal processing unit, characterized in that the waves incidenting from the object strike at least one chip equipped with photodiodes which transmits the taken photoexcitation to a neuronal network, and in that after alteration of defined individual or several object features such as spatial arrangement, shape, contours or feature changes by removing parts of the object, waves incidenting from this altered object strike the chip and the transmission of the photoexcitations received by the chip to the neuronal network continues at least so long until the neuronal network transmits at least one signal specific for the object that initiates defined sequence steps.

The method according to the invention is primarily applicable to identify objects from an object mixture and, preferably, to identify objects from the object mixture after separating the objects with subsequent initiation of sequence steps. A very important sequence step is the initiation of a sorting means which sorts the identified object out.

The object identification takes place in such a way that the objects are at first radiated with electromagnetic waves in ultraviolet range, within the range of visible light or in infrared range. The waves incidenting from the object, e.g. by object reflection or after penetrating or partially penetrating the object or reflection and partial absorption and output of waves in a wavelength other than the one originally used for the radiating waves, strike at least one chip equipped with photodiodes which transmits the taken photoexcitation to a neuronal network. The neuronal network is able to learn. In order to accomplish a faultless object identification, defined object alterations are effected, and radiation and infeed of the photoexcitation to the neuronal network are repeated correspondingly.

Such alterations are for instance object position changes so that the neuronal network receives waves incidenting from the front, bottom, rear side or from other views. Particular contours and shapes characteristic for an object are also important, e.g. the bottom contour of a yoghurt cup, and different surface conditions of an object. The evaluation of only characteristic object fragments is also possible.

After supplying a sufficient number of such different information to the neuronal network, it is able to accurately identify an object and then to transmit a specific signal or a plurality of specific signals which initiate defined sequence steps.

Hereby, putting a sorting means into operation is of special importance. Such a sorting means for instance sorts the identified object out from a conveyor belt on which the objects have been separated from object mixtures. According to the invention it is also possible to provide the device according to the invention with a means for spectral light analysis, e.g. a prism, a grid or a gap. As a consequence the photoexcitation absorbed by the chip is spectrally resolved before it is transmitted to the neuronal network, whereby the spectrally resolved radiation is fed to a cutoff filter and/or to a texture filter. The grey light obtained, preferably in addition, and the spectrally resolved light and/or the object contour provided by the cut-off filter and/or the surface structure provided by the texture filter are transmitted to the neuronal network. Other method and device features such as phase shifting may be used in addition for identification.

Another embodiment of the present invention consists of initial spectral analysis of the waves incidenting from the object with subsequent striking the chip equipped with photodiodes.

The sorting out operation according to the state of the art may be performed in various ways, e.g. pneumatically, hydraulically, mechanically or otherwise.

Object identification is in addition substantially improved by at first separating the objects from the object mixture.

It is well known that sorting out pure grades of plastics from plastic wastes is of particular importance in view of recycling plastic wastes.

The method according to the invention permits the very reliable identification of plastic wastes, even when they are radiated in different positions or are present only as fragments, thus enabling to recover grade-pure plastics for use in correspondingly high-grade recycling operations, and this without generation of images and without comparison with data memorized in a data base.

According to the invention preferably visible light is needed, however, UV and IR light according to the invention may be also used with excellent results.

The neuronal network may additionally be equipped with a so-called fuzzy control which enables the input of defined preliminary information into the neuronal network, and in addition the intervention in learning processes occurring in the neuronal network.

The present invention relates also to a device for implementing the method according to the invention, namely a device for object identification, preferably after the objects have been separated from object mixtures, the device comprising a radiation source for electromagnetic waves in UV to IR ranges and an electronic signal processing unit, characterized by at least one chip equipped with photodiodes for receiving electromagnetic waves incidenting from a radiated object, and a neuronal network to which the photoexcitation taken from the chip is transmitted, whereby the neuronal network is able to output object-specific signals for initiation of sequence step.

The invention relates further to the application and use of the method and device for identification, and identification and sorting out of objects, respectively.

We claim:

1. A method to identify objects by radiating them with electromagnetic waves in the UV to IR range, comprising:
    causing the waves incidenting from a said object to strike an electronic signal processing unit comprising at least one chip equipped with photoexcitable photodiodes which is connected to a neuronal network,
    effecting a predetermined alterations of defined features of said object, or effecting feature changes by deleting parts of the object, and further causing the waves incidenting from object to strike said electronic signal processing unit, feeding the resulting photoexcitations from said chip equipped with photodiodes to the neuronal network until the neuronal network transmits at least one signal specific for the object, which signal initiates a predetermined sequence step.

2. A method according to claim 1, wherein the objects to be identified comprise an object mixture, and the object mixture is a waste mixture.

3. A method according to claim 1, wherein said predetermined sequence step comprises the activation of a sorting means which sorts out the object which has been identified by means of the specific signal transmitted by the neuronal network.

4. A method according to claim 1, wherein the neuronal network operates in association with a fuzzy control means.

5. A method according to claim 1, wherein the photoexcitation received by the chip is spectrally analyzed and fed to a cut-off filter or a texture filter or to both a cut-off filter and a texture filter before being transmitted to the neuronal network.

6. A method according to claim 1, wherein the waves incidenting from the object are spectrally analyzed and subsequently strike the chip equipped with photodiodes.

7. A method according to claim 1, wherein said electromagnetic waves comprise visible light.

8. A method according to claim 1, the objects to be identified are initially in an object mixture, and said object mixture is separated prior to the identification.

9. A device for performing the method according to claim 1 which comprises a radiation source for electromagnetic waves in UV to IR ranges, an electronic signal processing unit including at least one chip equipped with photodiodes for receiving electromagnetic waves incidenting from a radiated object, and a neuronal network to which photoexcitation received from the chip is transmitted, whereby the neuronal network is capable to transmit object-specific signals for initiation of sequence steps.

10. A device according to claim 9, further comprising a sorting means suitable for evaluation of the object-specific signal, said sorting means being connected to the device.

11. A device according to claim 9, wherein the neuronal network is provided with a fuzzy control means.

12. A device according to claim 9, wherein the device further comprises a means for spectral light resolution, a cut-off filter, a texture filter or a combination thereof.

* * * * *